(12) United States Patent
Kulkarni et al.

(10) Patent No.: US 8,563,092 B2
(45) Date of Patent: Oct. 22, 2013

(54) FORMATION OF PALLADIUM SULFIDE (75) Inventors: Giridhar U Kulkarni, Karnataka (IN);
Boya Radha, Andhra Pradesh (IN)

(73) Assignee: Jawaharial Nehru Centre for Advanced Scientific Research, Karnataka (IN)

( * ) Notice: Subject to any disclaimer, the term of this patent is extended or adjusted under 35 U.S.C. 154(b) by 358 days.

(21) Appl. No.: 12/881,700

(22) Filed: Sep. 14, 2010

(65) Prior Publication Data
US 2012/0064257 A1    Mar. 15, 2012

(51) Int. Cl.
*B05D 3/00* (2006.01)
*C08J 7/18* (2006.01)
*G21H 5/00* (2006.01)

(52) U.S. Cl.
USPC ........... 427/552; 427/226; 427/256; 427/282; 118/64

(58) Field of Classification Search
USPC ........................................ 427/552
See application file for complete search history.

(56) References Cited

U.S. PATENT DOCUMENTS

2008/0008822 A1* 1/2008 Kowalski et al. ............... 427/58

FOREIGN PATENT DOCUMENTS

| JP | 61215661 | 9/1986 |
| JP | 3126035 | 5/1991 |
| JP | 8095209 | 12/1996 |
| WO | 2007/141577 | 12/2007 |

OTHER PUBLICATIONS

Zhiqiang Yang, Alexander B. Smetana, Christopher M. Sorensen, and Kenneth J. Klabunde. Synthesis and Characterization of a New Tiara Pd(II) Thiolate Complex, [Pd(SC12H25)2]6, and Its Solution-Phase Thermolysis to Prepare Nearly Monodisperse Palladium Sulfide Nanoparticles. 2007. Inorg. Chem. 46. 2427-2431.*

Jinwoo Cheon, David S. Talaga, and Jeffrey I. Zink. Laser and Thermal Vapor Deposition of Metal Sulfide (NiS, PdS) Films and in Sity Gas-Phase Luminescences of Photofragments from M(S2COCHMe2)2. 1997. Chem. Materi. 9. 1208-1212.*

Paul O'Brien and John Waters. Deposition of Ni and Pd Sulfide Thin Films via Aerosol-Assisted CVD. 2006. Chem. Vap. Deposition. 12. 620-626.*

Willmott et al. (2000) "Pulsed laser vaporization and deposition"; Reviews of Modern Physics, 72(1): 315-328.

Ritch et al. (2007) "The single molecular precursor approach to metal telluride thin films: imino-bis (diisopropylphosphine tellurides) as examples"; Chem. Soc. Rev., 36: 1622-1631.

Birri et al. (2007) "Allyl palladium dithiocarbamates and related dithiolate complexes as precursors to palladium sulfides"; Journal of Organometallic Chemistry, 692: 2448-2455.

(Continued)

*Primary Examiner* — Dah-Wei Yuan
*Assistant Examiner* — Kristen A Dagenais
(74) *Attorney, Agent, or Firm* — Moritt Hock & Hamroff LLP; Steven S. Rubin, Esq.

(57) ABSTRACT

Technologies are generally described for methods and systems of forming a palladium sulfide film on a substrate including flexible substrate. A palladium sulfide precursor may be applied to the substrate. The palladium sulfide precursor may comprise a palladium organothiolate. The palladium sulfide precursor may be heated under reaction conditions sufficient to decompose the palladium sulfide precursor to form the palladium sulfide film or patterns, the latter using various lithography techniques.

26 Claims, 6 Drawing Sheets

(56) References Cited

OTHER PUBLICATIONS

Schneider et al. (2009) "Zinc oxide derived from single source precursor chemistry under chimie douce conditions: Formation pathway, defect chemistry and possible applications in thin film printing"; J. Mater. Chem., 19: 1449-1457. (Supplementary Info. (2009) 1-4).
Fischer et al. (1996) "Triazidogallim and Derivatives: New Precursors to Thin Films and Nanoparticles of GaN"; Chem. Eur. J., 2(11): 1353-1358.
Yang et al., (2007) "Synthesis and Characterization of a New Tiara Pd(II) Thiolate Complex, [Pd(Sc12H25)2]6, and Its Solution-Phase Thermolysis to Prepare Nearly Monodisperse Palladium Sulfide Nanoparticles", Inorg. Chem. 46(7) Abstract.
Greco et al. (2008) "Conductive Sub-micrometric Wires of Platinum-Carbonyl Clusters Fabricated by Soft-Lithography"; J. Am. Chem. Soc.; 130(4): 1177-1182. (Suppl. Info. JA074104, S1-S2).
Nomura et al. (1989) "Preparation of Copper Sulfide Powders and Thin Films by Thermal Decomposition of Copper Dithiocarbamate Complexes"; Ind. Eng. Chem. Res., 28(6): 877-880.
Gather et al. (2007) "Solution-Processed Full-Color Polymer Organic Light-Emitting Diode Displays Fabricated by Direct Photolithography"; Adv. Funct. Mater., 17: 191-200.
Corbierre et al. (2005) "Gold Nanoparticles Generated by Electron Beam Lithography of Gold(I)—Thiolate Thin Films"; Chem. Mater., 17: 5774-5779.
Stark et al. (1991) "Electron beam induced metalization of palladium acetate"; J. Vac. Sci. Technol., B 9(6): 3475-3478.
Chuang et al. (2006) "Nanolithography made from water-based spin-coatable LSMO resist"; Nanotechnology, 17: 4399-4404.
Saifullah et al. (2003) "Sub-10 nm Electron Beam Nanolithography Using Spin-Coatable TiO2 Resists"; Amer. Chem. Soc., 3(11): 1587-1591.
Rao et al. (1974-75) "Transition Metal Sulfides"; Progress in Solid State Chemistry, 10(4): 207-270.
Fischmeister (1959) "Electrical Conductivity of Some Palladium Sulfides and of Silver Palladium Sulfide"; Acta Chem. Scand., 13(4): 852-853.
Morreale et al. (2007) "Experimental and Computational Prediction of the Hydrogen Transport Properties of Pd4S"; Ind. Eng. Chem. Res., 46: 6313-6319.
Gronvold et al. (1962) "The Crystal Structures of Pd4Se and Pd4S"; Acta Cryst., 15: 11-13.
Bladon et al. (1996) "A Palladium Sulfide Catalyst for Electrolytic Plating"; J. Electrochem. Soc., 143(4): 1206-1213.
Zubkov et al. (1998) "Enthalpies of formation of the palladium sulphides"; J. Chem. Thermodynamics, 30:571-581.
Ferrer et al. (2007) "An investigation on palladium sulphide (PdS) thin films as a photovoltaic material"; Thin Solid Films, 515: 5783-5786.
Gronvold et al. (1956) "On the Sulfides, Selenides and Tellurides of Palladium"; Acta Chem. Scand., 10(10): 1620-1634.
Groenvold et al. (1969) "Tetrapaladium Sulfide and Tetrapalladium Selenide Heat Capacities and Thermodynamic Properties from 5° to 350° K."; J. Chem. and Engineer. Data, 14(2): 205-207.
Diaz-Chao et al. (2009) "Cubic Pd1657 as a Precursor Phase in the Formation of Tetragonal PdS by Sulfuration of Pd Thin Films"; J. Phys. Chem., 113: 5329-5335.
O'Brien et al. (2006) "Deposition of Ni and Pd Sulfide Thin Films via Aerosol-Assisted CVD"; Chem. Vap. Deposition 12: 620-626.
Kim et al. (1995) "Polymer microstructures formed by moulding in capillaries"; Nature, 376: 581-584.
Ghavale et al. (2008) "Synthesis and Characterization of Chalcogenolato-Bridged Allyl Palladium Complexes: Versatile Precursors for Palladium Chalcogenides"; Organomet. Chem., 27: 3297-3302.
Dey et al. (2004) "Platinum Group Metal Chalcogenides Their Synthesis and Applications in Catalysis and Materials Science"; Platinum Metals Rev., 48(1): 16-29.
Nakamoto et al. (2002) "Thermolysis of gold(I) thiolate complexes producing novel gold nanoparticles passivated by alkyl groups"; Chem. Commun., pp. 1622-1623.
Carotenuto et al. (2003) "A universal method for the synthesis of metal and metal sulfide clusters embedded in polymer matrices"; J. Mater. Chem., 13: 2927-2930.
Thomas et al. (2001) "Self-assembling bilayers of palladiumthiolates in organic media"; Proc. Indian Acad. Sci., 113(5 & 6): 611-619.
Bhuvana et al. (2009) "Electron Resist Behavior of Pd Hexadecanethiolate Examined Using X-ray Photoelectron Spectroscopy with Nanometric Lateral Resolution"; Amer. Chem. Soc., 25: 1259-1264.
Radha et al. (2009) "A Modified Micromolding Method for Sub-100-nm Direct Patterning of Pd Nanowires"; Wiley InterScience, www.small-journal.com, pp. 1-5.
Yang et al. (1999) "A Kinetic Study of Direct Copper Plating via Pd Catalyst and S Ligand", J. Electrochem. Soc., 146 (12): 4473-4476.
Radha et al. (2010) "Patterned Synthesis of Pd4S: Chemically Robust Electrodes and Conducting Etch Masks", Adv. Funct. Mater. 20: 1-6.
Ono et al. (1999) "Mechanism of Direct Copper Plating on Nonconducting Substrates", J. Electrochem. Soc., 146(1): 160-166.
Bhuvana et al. (2008) "Highly Conducting Patterned Pd Nanowires by Direct-Write Electron Beam Lithography"; American Chemical Society; 2(3): 457-462.
Saifullah, M.S.M., et al., "Sub-10nm High-Aspect-Ratio Patterning of ZnO Using an Electron Beam," Advance Materials, 2005, pp. 1757-1761, vol. 17, Issue 14.

* cited by examiner

FORMATION OF PALLADIUM SULFIDE

BACKGROUND

Unless otherwise indicated herein, the materials described in this section are not prior art to the claims in this application and are not admitted to be prior art by inclusion in this section.

Palladium can be combined with sulfur in various proportions to form palladium sulfide $Pd_xS_y$, wherein x and y can be the same or different and both x and y may be equal to or greater than 1.0. In some examples, palladium sulfide may have the formula: $PdS$, $Pd_{2.2}S$, $PdS_2$, $Pd_4S$, $Pd_{16}S_7$ or $Pd_3S$. Palladium sulfide may be used as a catalyst and may have properties of electrical conductivity, corrosion resistance and reduced permeability to hydrogen.

SUMMARY

In an example, a method for forming a palladium sulfide film on a substrate is generally described. In some examples, the method includes applying a palladium sulfide precursor to the substrate. In some examples, the palladium sulfide precursor is a palladium organothiolate. In some examples, the method further includes heating the palladium sulfide precursor under reaction conditions sufficient to decompose the palladium sulfide precursor to form the palladium sulfide film.

In an example, a method for forming a crystalline, single phase, electrically conductive $Pd_4S$ film on a substrate is generally described. In some examples, the method includes applying a palladium alkanethiolate to a substrate. In some examples, the method includes patterning the palladium alkanethiolate to form a patterned precursor. In some examples, the method includes heating the patterned precursor with hydrogen in a reaction chamber at a temperature of from about 180 degrees C. to about 300 degrees C. for about 100 minutes to about 200 minutes to form the $Pd_4S$ film on the substrate.

In an example, a system effective to form a palladium sulfide film on a substrate is generally described. In some examples, the system includes an applicator and a reaction chamber. In some examples, the applicator is effective to apply a palladium sulfide precursor to a substrate. In some examples, the palladium sulfide precursor includes a palladium organothiolate. In some examples, the reaction chamber is effective to heat the palladium sulfide precursor under reaction conditions sufficient to decompose the palladium sulfide precursor to form the palladium sulfide film.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, materials and apparatus related to forming palladium sulfide.

Briefly stated, technologies are generally described for methods and systems of forming a palladium sulfide film on a substrate. A palladium sulfide precursor may be applied to the substrate. The palladium sulfide precursor may comprise a palladium organothiolate. The palladium sulfide precursor may be heated under reaction conditions sufficient to decompose the palladium sulfide precursor to form the palladium sulfide film.

Other than in the working examples or where otherwise indicated, at least some numbers expressing amounts of materials, reaction conditions, time durations, quantified properties of materials, and so forth, stated in the specification and claims are to be understood as being modified by the term "about."

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

In an example, the present disclosure generally describes methods to form a palladium sulfide. In an example, some methods described herein may be adapted to produce pure crystalline $Pd_4S$ palladium sulfide as a film on a substrate with limited harmful gases or production of mixed phases. The $Pd_4S$ film may have the characteristics of being electrically conductive, corrosion resistant and impermeable to hydrogen. The palladium sulfide may further possess catalytic properties and may be formed on flexible as well as rigid substrates, and on flat or curved substrates.

As described in more detail below, in an example, an applicator may be effective to apply a palladium sulfide precursor to a substrate. In an example, the precursor may be patterned by, for example, electron beam, soft lithography techniques, micromolding in capillaries, or printing techniques such as offset printing, inkjet or silkscreen printing. In an example, the substrate with the patterned or un-patterned precursor may then be placed in an oven and heated to a decomposition temperature for a sufficient reaction time. The substrate and the precursor may be heated in an atmosphere of hydrogen, sulfur-containing gas, or an inert gas such as argon or nitrogen. Based on the heating, a palladium sulfide film may be formed on the substrate.

In an example, the palladium sulfide precursor may be a palladium organothiolate having the formula Pd(SR)$_2$ wherein R is a hydrocarbon group having from about 4 to about 20 carbon atoms. R may be a saturated or unsaturated, straight or branched chain or cyclic aliphatic group, an aromatic group or a combined aliphatic-aromatic group, an alkyl group and/or an alkenyl group. In an example, the palladium organothiolate may be a palladium alkanethiolate having from about 8 to about 16 carbon atoms. In an example, the palladium sulfide precursor may be palladium octanethiolate or palladium hexadecylthiolate. Under reaction conditions the palladium sulfide precursor, such as palladium organothiolate, may be decomposed to form a palladium sulfide. In an example, the palladium sulfide is crystalline.

The palladium sulfide precursor may be dissolved in a suitable solvent such as, for example, ethanol or toluene to produce a palladium sulfide precursor solution. The choice of solvent depends at least in part on the number of carbon atoms in the R group. Any concentration of the solution suitable for the purposes described herein can be employed. In some examples, the solvent may be evaporated to produce a dry film.

Figure 1:
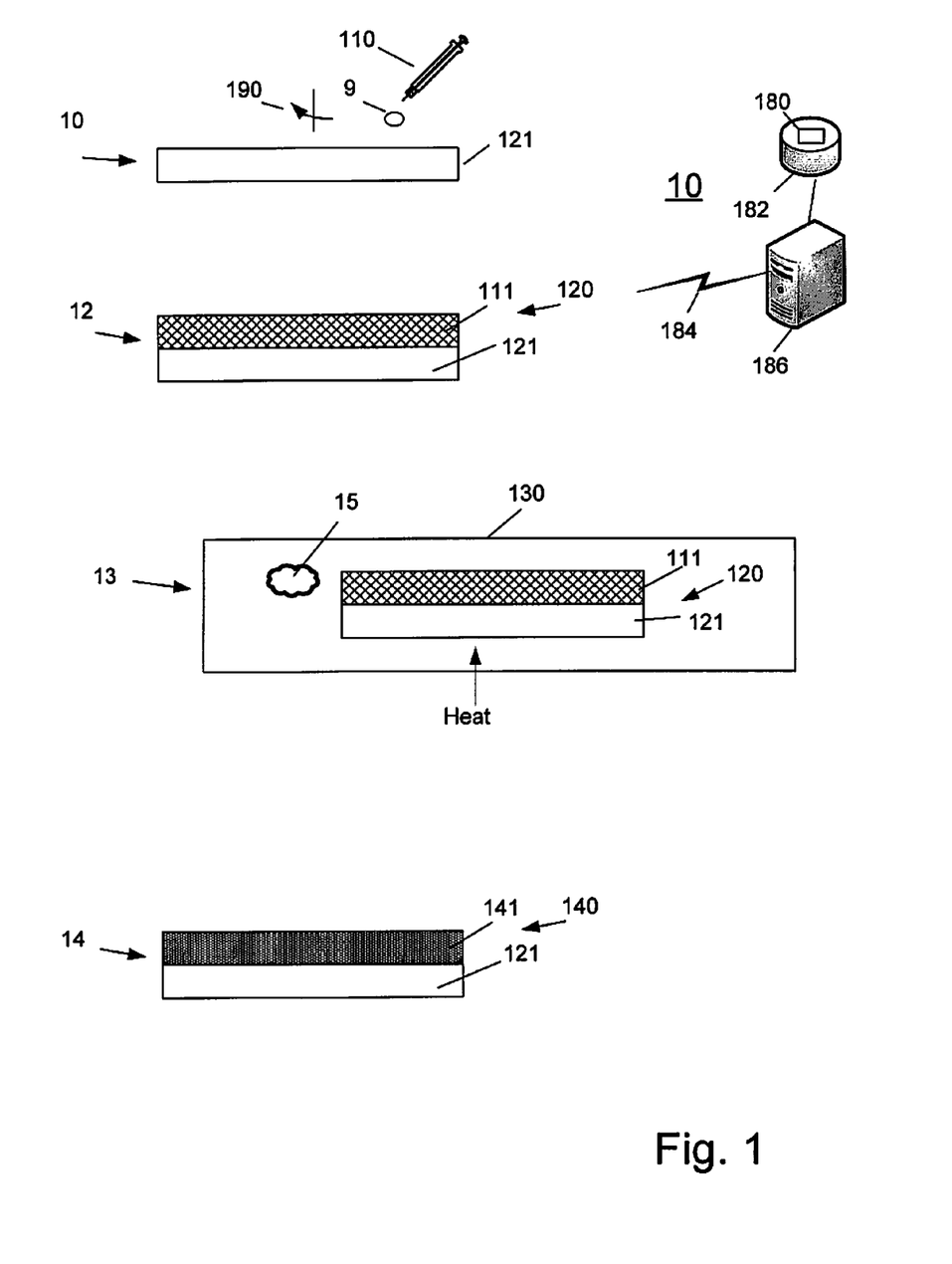
FIG. 1 illustrates an example system that can be utilized to implement formation of palladium sulfide.

FIG. 1 illustrates an example system that can be utilized to implement formation of palladium sulfide arranged in accordance with at least some embodiments described herein. In an example, a palladium sulfide formation system 10 may include a processor 186, a substrate 121, an applicator 110 and a reaction chamber such as an oven 130. In some examples, processor 186 may be in communication with a memory 182. In some examples, processor 186 may be configured to control at least some of the operations of applicator 110 and/or reaction chamber 130 described below based on instructions 180 in memory 182. Processor 186 may be in communication with applicator 110 and/or reaction chamber 130 through a communication link 184 such as a network. In an example, a palladium sulfide precursor 9 such as a palladium organothiolate, may be applied by dropper, spray or other suitable applicator 110, to substrate 121. Suitable substrates include, for example, silicon, glass, silica, alumina, metals, ceramics, polymers capable of withstanding the reaction conditions. Substrate 121 may be flexible or rigid, flat or curved. In some examples, palladium organothiolate 9 can be applied neat, such as without admixture. In examples where a palladium organothiolate solution is used, substrate 121 may be spun, as shown by 190, to distribute palladium organothiolate 9 evenly across substrate 121. As shown at 12, in an example, palladium organothiolate 9 may be allowed to dry leaving palladium organothiolate coating 111 on substrate 121 producing structure 120.

In an example, as shown at 13, structure 120 may be heated in a reaction chamber such as oven 130, sufficient to decompose the palladium sulfide precursor into palladium sulfide. In some examples, the palladium sulfide precursor may be heated to a temperature of, for example, from about 180 degrees C. to about 300 degrees C. In an example, oven 130 may include an atmosphere 15 of flowing hydrogen, a sulfur-containing gas, or an inert gas such as argon or nitrogen. In an example, structure 120 may be heated for a period of time ranging from about 100 minutes to about 200 minutes. In some examples, temperature and time of heating can be adjusted relative to each other to substantially completely decompose the palladium organothiolate coating 111 to form palladium sulfide. In some examples, where hydrogen is used as atmosphere 15 inside oven 130, H$_2$S and free hydrocarbon may be given off during the reaction.

As shown at 14, in an example, after heating structure 120 in oven 130, a structure 140 may be formed including substrate 121 with a layer of palladium sulfide 141. In an example, layer 141 may include a thickness of from about 100 nanometers to about 1 micron. Films with a thickness outside of this range may be formed.

In an example, when palladium sulfide precursor 9 is palladium alkanethiolate of from about 8 to about 16 carbon atoms, atmosphere 15 includes hydrogen and the reaction temperature is from about 180 degrees C. to about 300 degrees C., layer 141 may be Pd$_4$S. In an example, when palladium sulfide precursor 9 is palladium alkanethiolate of from about 8 to about 16 carbon atoms, atmosphere 15 includes argon, and the reaction temperature is from about 180 degrees C. to about 300 degrees C., layer 141 may be Pd$_{16}$S$_7$. In an example, when palladium sulfide precursor 9 is palladium alkanethiolate of from about 8 to about 16 carbon atoms, atmosphere 15 includes a sulfur-containing gas, and the reaction temperature is from about 180 degrees C. to about 300 degrees C., layer 141 may be PdS.

Figure 2:
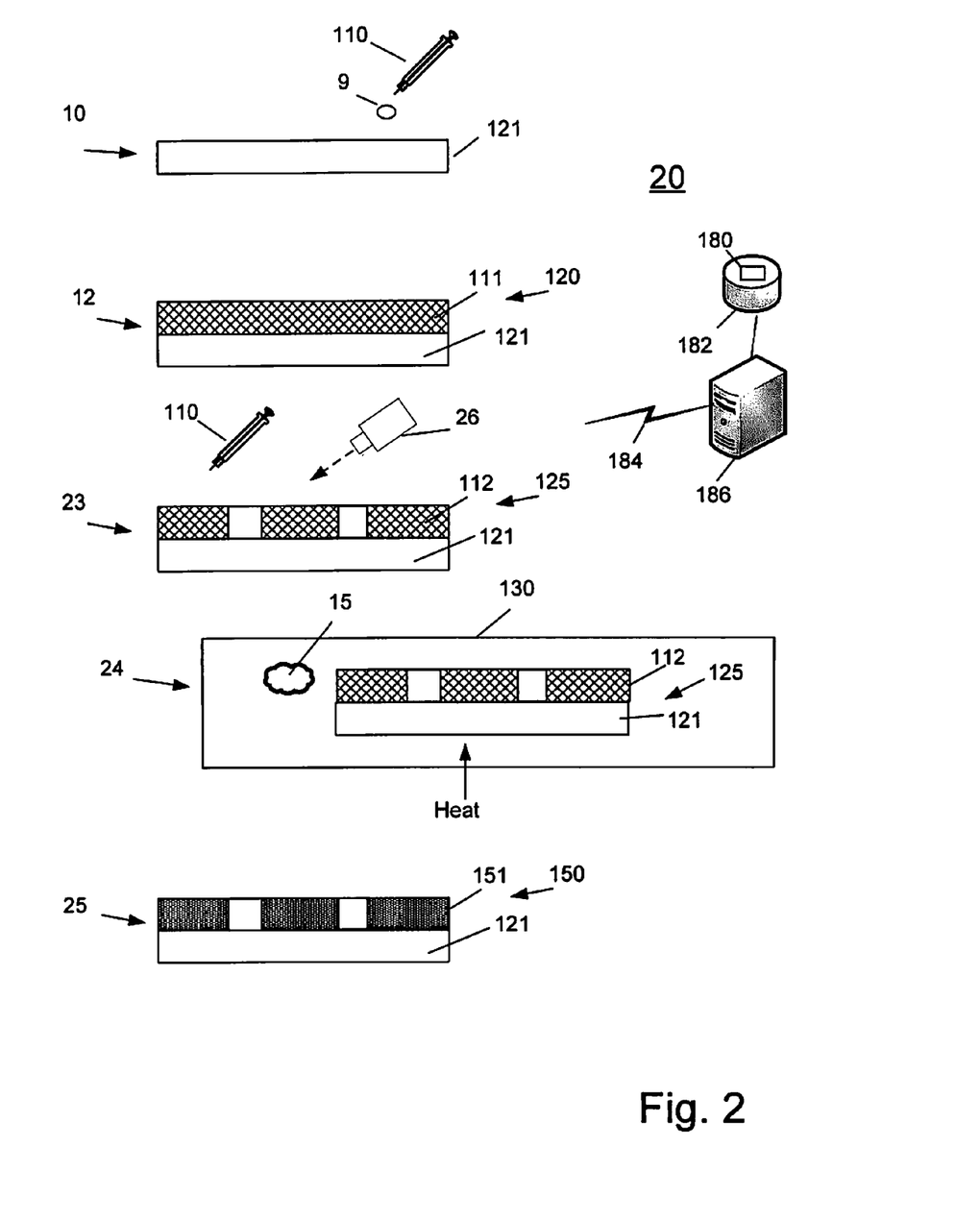
FIG. 2 illustrates an example system that can be utilized to implement formation of palladium sulfide.

FIG. 2 illustrates some example systems that can be utilized to implement formation of palladium sulfide arranged in accordance with at least some embodiments described herein. The system 20 of FIG. 2 is substantially similar to system 10 of FIG. 1. Those components in FIG. 2 that are labeled identically to components of FIG. 1 will not be described again for the purposes of clarity.

In an example, a palladium sulfide formation system 20 may include processor 186, substrate 121, applicator 110, a patterning device 26, and reaction chamber 130. In some examples, processor 186 may be configured to control at least some of the operations of applicator 110, reaction chamber 130, and/or patterning device 26 described below based on instructions 180 in memory 182.

As mentioned above, at 10, palladium sulfide precursor 9, such a palladium organothiolate, may be applied by applicator 110 to substrate 121. As shown at 12, in an example, palladium organothiolate 9 may be dried, such as by ambient conditions or by heating, leaving palladium organothiolate coating 111 on substrate 121 producing a palladium sulfide precursor coated substrate 120.

In an example, as shown at 23, palladium sulfide precursor 9 may be patterned by patterning device 26 and/or applicator 110. For example, device 26 and/or applicator 110 may be an electron beam patterning device, an offset printing device, an inkjet printing device, a silkscreen printing device, etc. In the example, patterning by device 126 may produce a structure 125 including a patterned precursor 112 of the palladium organothiolate 9 on substrate 121. In an example, as shown at 24, structure 125 may be heated in oven 130 under the conditions described above. As shown at 25, in an example, structure 150, may be removed from reaction chamber 130. Structure 150 may include substrate 121 including patterned palladium sulfide 151.

Figure 3:
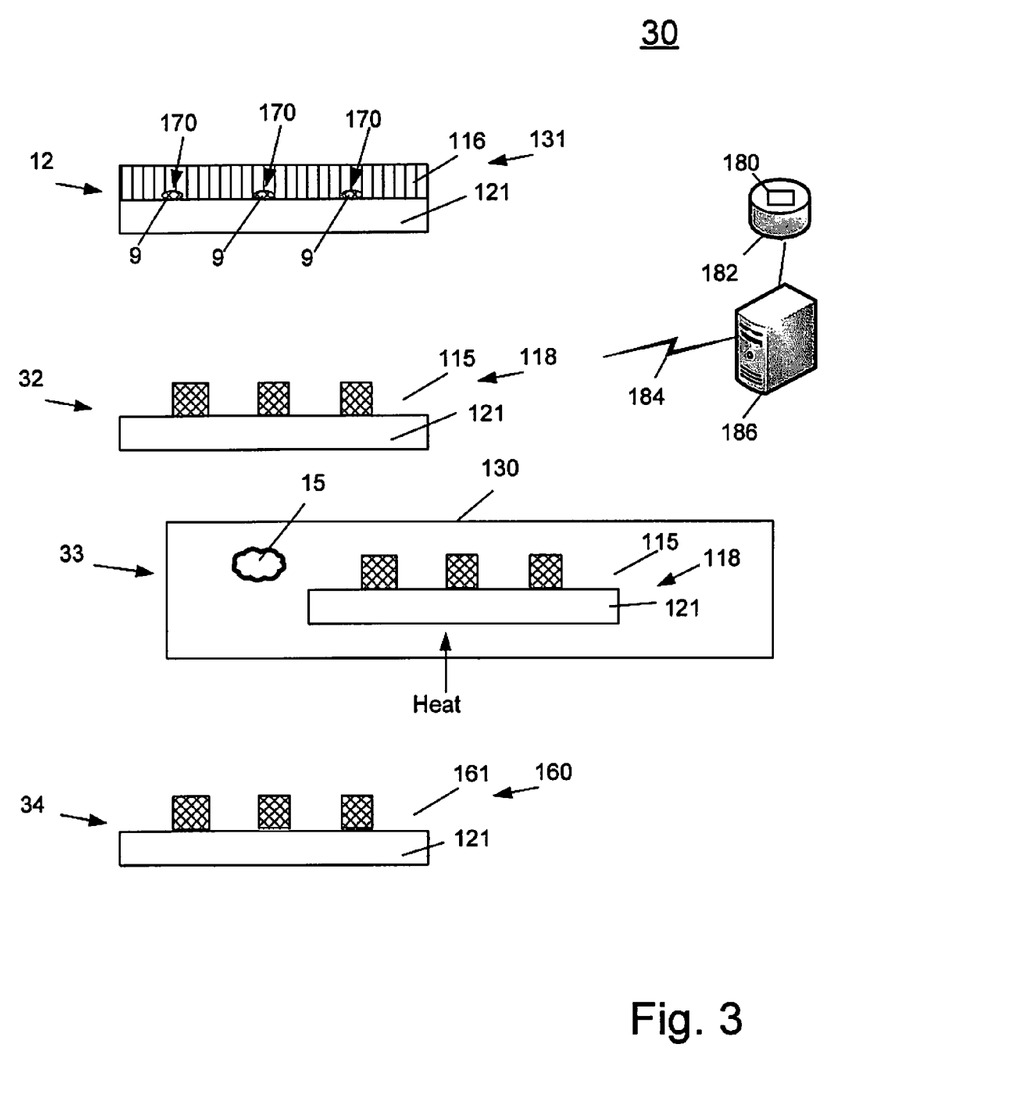
FIG. 3 illustrates an example system that can be utilized to implement formation of palladium sulfide.

FIG. 3 illustrates some example systems that can be utilized to implement formation of palladium sulfide arranged in accordance with at least some embodiments described herein. The system 30 of FIG. 3 is substantially similar to system 10 of FIG. 1 and system 20 of FIG. 2. Those components in FIG. 3 that are labeled identically to components of FIG. 1 and/or FIG. 2 will not be described again for the purposes of clarity.

In an example, a palladium sulfide formation system 30 may include processor 186, substrate 121, an applicator block 116, and reaction chamber 130. In an example, as shown at 31, palladium precursor 9, such as palladium organothiolate, may be applied on substrate 121 in capillaries 170. In an example, a micromolding in capillaries ("MIMIC") approach may be used. In an example, processor 186 may be configured to control the MMIC approach based on instructions 180 in memory 182. In some examples, capillaries 170 may be formed in one or more of applicator block 116 and/or substrate 121. In some examples, palladium organothiolate 9 may be applied to the ends of the surfaces perpendicular to capillaries 170. Palladium organothiolate 9 may be drawn by capillary action into capillaries 170. In some examples, block 116 may be removed. In some examples, palladium organothiolate 9 may be dried to produce structure 118 including patterned precursor 115 of the palladium organothiolate on the substrate 121. In some examples, as shown at 33, structure 118 may be heated in oven 130 under the conditions described above. As shown at 34, in an example, structure 160, may be removed from reaction chamber 130. Structure 160 may include substrate 121 including patterned palladium sulfide 161.

In an example, a substrate may first be coated with a layer of a noble metal such as gold. The palladium sulfide precursor may then be deposited on the gold layer in a pattern to form a patterned substrate. The patterned substrate may then be placed in an oven as described above to promote a reaction with hydrogen to form a patterned palladium sulfide over the layer of gold. The substrate may then subjected to etching to remove the gold not covered by the patterned palladium sulfide. In an example, another metal may be deposited over the patterned palladium sulfide by, for example, electrochemical deposition or some other suitable method.

In an example, Si(111) (n-doped, 4-7$\Omega$.cm) and glass substrates may be cleaned by sonicating in acetone and double-distilled water and dried under flowing argon. In the example, palladium octanethiolate ($Pd(SC_8H_{17})_2$) may be prepared by making $Pd(OAc)_2$ (5.0 mmol, SIGMA ALDRICH) react with octanethiol (5.0 mmol) in toluene. In the example, produced thiolate may be washed with methanol and acetonitrile, and produced powder may be dissolved in toluene to obtain a solution of about 10 millimolars. In the example, an aliquot of about 60 μL of the thiolate solution may be drop-coated on a glass substrate, and the solvent evaporated by heating to about 60 degrees C. In the example, the film may be gradually heated in a $H_2$ atmosphere to about 250 degrees C. and held for about 30 min to form the palladium sulfide.

Figure 4:
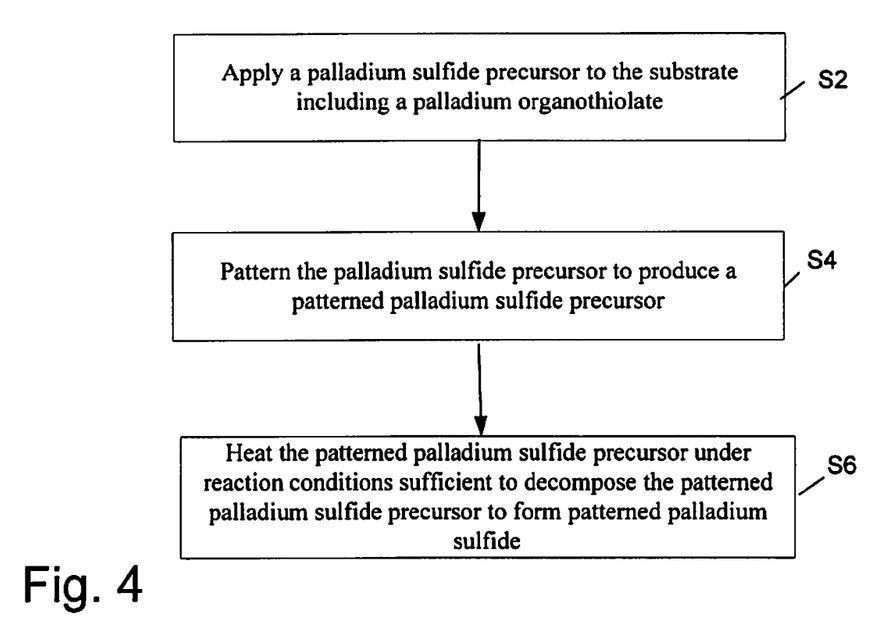
FIG. 4 depicts a flow diagram for an example process for forming palladium sulfide.

FIG. 4 depicts a flow diagram for an example process for forming palladium sulfide in accordance with at least some embodiments described herein. The process in FIG. 4 could be implemented using, for example, system 10, 20 and/or 30 discussed above. An example process may include one or more operations, actions, or functions as illustrated by one or more of blocks S2, S4 and/or S6. Although illustrated as discrete blocks, various blocks may be divided into additional blocks, combined into fewer blocks, or eliminated, depending on the desired implementation. Processing may begin at block S2.

At block S2, a palladium sulfide formation system may be configured to apply a palladium sulfide precursor to a substrate. In some examples, the palladium sulfide precursor may be applied by dropper, spray or other suitable applicator. In some examples, the palladium sulfide precursor may include a palladium organothiolate. Processing may continue from block S2 to block S4.

At block S4, the palladium sulfide formation system may be configured to pattern the palladium sulfide precursor to produce a patterned palladium sulfide precursor. In some examples, an electron beam patterning device, an offset printing device, an inkjet printing device, a silkscreen printing device, and/or a device using a MIMIC approach may be used to pattern the palladium sulfide precursor. Processing may continue from block S4 to block S6.

At block S6, the palladium sulfide formation system may be configured to heat the patterned palladium sulfide precursor under reaction conditions. In some examples, a reaction chamber or an oven may be used to heat the palladium sulfide precursor. In some examples, the reaction conditions may be sufficient to decompose the patterned palladium sulfide precursor to form a patterned palladium sulfide.

Figure 5:
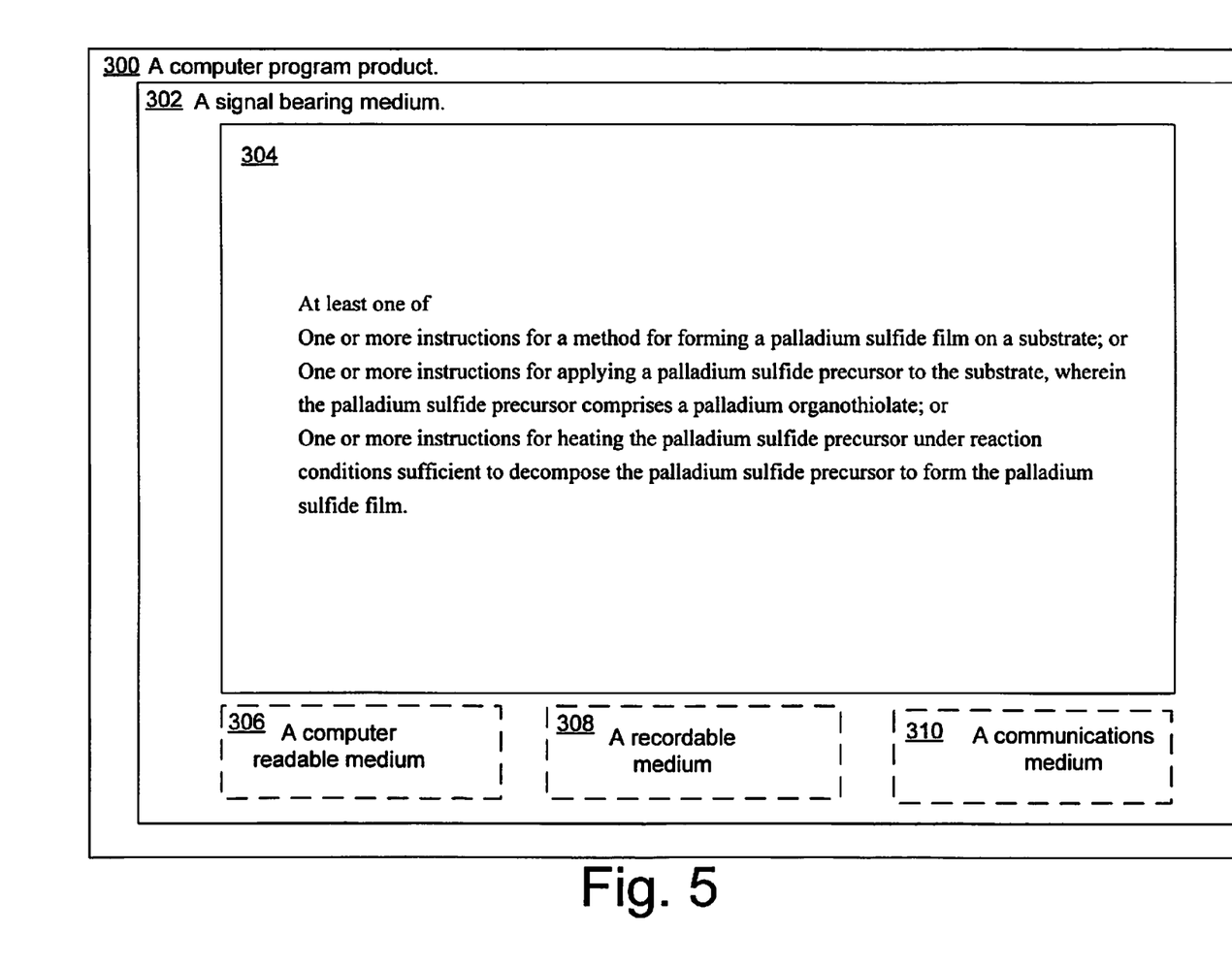
FIG. 5 illustrates a computer program product that can be utilized to implement formation of palladium sulfide.

FIG. 5 illustrates a computer program product that can be utilized to implement formation of palladium sulfide arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-4. Thus, for example, referring to system 10, and/or 30, may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 6:
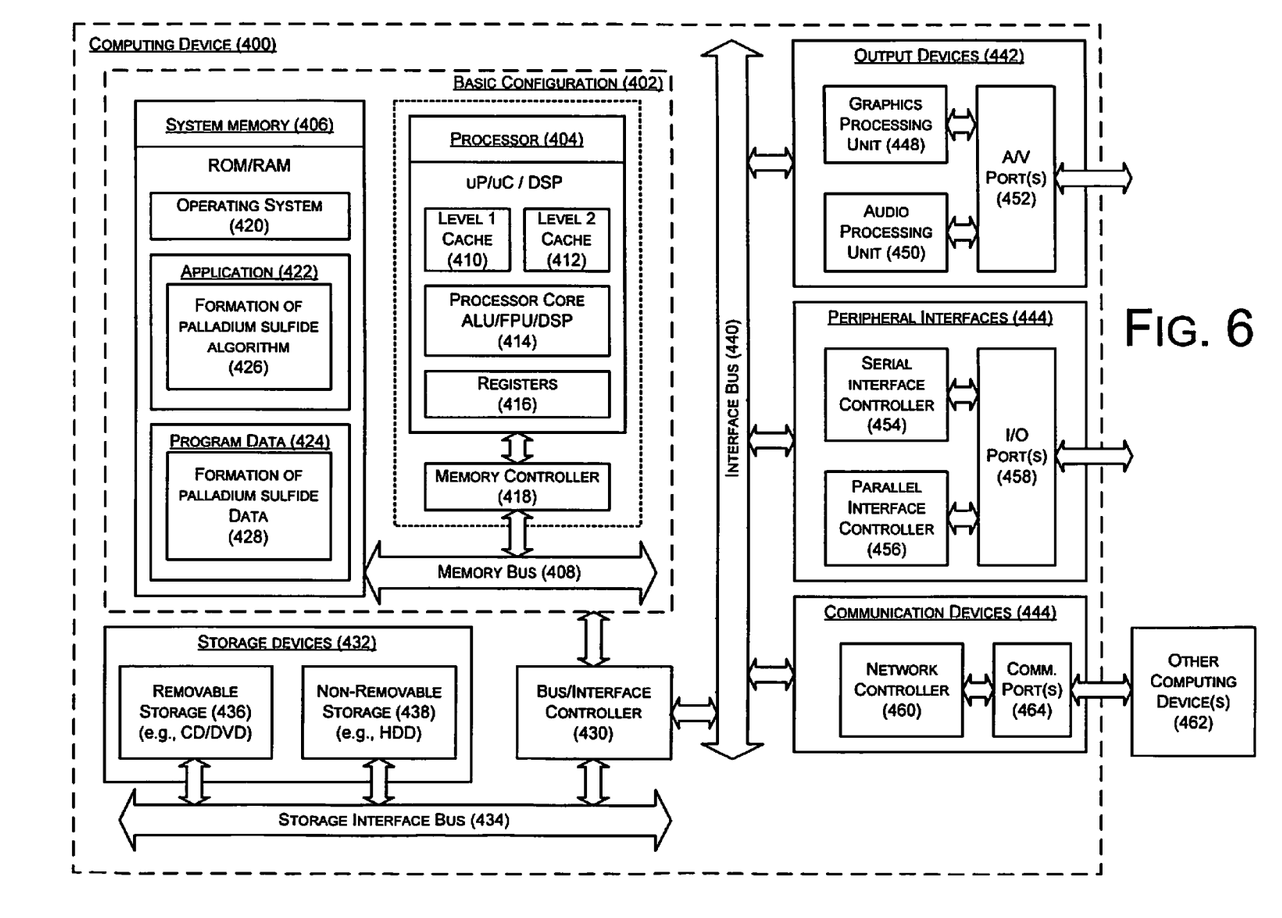
FIG. 6 is a block diagram illustrating an example computing device that is arranged to implement formation of palladium sulfide; all arranged according to at least some embodiments described herein.

FIG. 6 is a block diagram illustrating an example computing device that is arranged to implement formation of palladium sulfide arranged according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a formation of palladium sulfide algorithm 426 that is arranged to perform the functions as described herein including those described with respect to systems 10, 20 and/or 30 of FIGS. 1-4. Program data 424 may include formation of palladium sulfide data 428 that may be useful for forming palladium sulfide as is described herein. In some embodiments, application 422 may be arranged to operate with program data 424 on operating system 420 such that formation of palladium sulfide may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for forming a palladium sulfide film on a substrate, the method comprising:

applying a palladium sulfide precursor to the substrate, wherein the palladium sulfide precursor comprises a palladium organothiolate; and     heating the palladium sulfide precursor in an atmosphere to decompose the palladium sulfide precursor to form the palladium sulfide film, where the atmosphere includes hydrogen or a sulfur-containing gas.

2. The method of claim 1, wherein the palladium sulfide precursor has the formula $Pd(SR)_2$, wherein R is a hydrocarbon group having from about 4 to about 20 carbon atoms and wherein R and is selected from the group consisting of an alkyl group, an alkenyl group and an aromatic group.

3. The method of claim 2, wherein R is an alkyl group having from 8 to 16 carbon atoms.

4. The method of claim 2, wherein the palladium sulfide precursor is selected from the group consisting of palladium octanethiolate and palladium hexadecylthiolate.

5. The method of claim 1, further comprising applying the palladium sulfide precursor by:

dissolving a solution of the palladium sulfide precursor in a solvent to produce a solution;

applying the solution to the substrate; and evaporating the solvent to produce a dry film.

6. The method of claim 5, further comprising spinning the substrate to distribute the solution across the substrate.

7. The method of claim 5, further comprising dissolving the solution in a solvent selected from the group consisting of ethanol and toluene.

8. The method of claim 1, further comprising applying the palladium sulfide precursor to a substrate fabricated from a material selected from the group consisting of silicon, glass, silica, alumina, metal, ceramic and polymer.

9. The method of claim 1, further comprising applying the palladium sulfide precursor to a flexible substrate.

10. The method of claim 1, further comprising applying the palladium sulfide precursor to a curved substrate.

11. The method of claim 1, further comprising patterning the palladium sulfide precursor.

12. The method of claim 11, further comprising patterning the palladium sulfide precursor by electron beam patterning.

13. The method of claim 11, further comprising patterning the palladium sulfide precursor by at least one of micromolding the precursor in capillaries, offset printing, inkjet printing, or silkscreen printing.

14. The method of claim 1, further comprising heating the palladium sulfide precursor in an atmosphere of flowing hydrogen in a reaction chamber and wherein the reaction conditions include a temperature of from about 180 degrees C. to about 300 degrees C. and a reaction time of from about 100 minutes to about 200 minutes, and the palladium sulfide film comprises single phase, crystalline $Pd_4S$.

15. The method of claim 1, further comprising heating the palladium sulfide precursor in an atmosphere of flowing sulfur-containing gas in a reaction chamber and wherein the reaction conditions include a temperature of from about 180 degrees C. to about 300 degrees C. and a reaction time of from about 100 minutes to about 200 minutes, and the palladium sulfide comprises PdS.

16. The method of claim 1, further comprising, prior to applying the palladium sulfide precursor, coating the substrate with a gold layer.

17. The method of claim 16, further comprising patterning the palladium sulfide precursor.

18. The method of claim 17, further comprising etching at least some of the gold layer.

19. The method of claim 18, further comprising depositing a metal on the palladium sulfide film.

20. The method of claim 19, wherein the metal is selected from the group consisting of gold, silver and copper.

21. A method for forming a crystalline, single phase, electrically conductive $Pd_4S$ film on a substrate, the method comprising:
   applying a palladium alkanethiolate to a substrate;
   patterning the palladium alkanethiolate to form a patterned precursor, and
   heating the patterned precursor with hydrogen in a reaction chamber at a temperature of from about 180 degrees C. to about 300 degrees C., and for about 100 minutes to about 200 minutes, to form the $Pd_4S$ film on the substrate.

22. The method of claim 21, further comprising patterning the palladium alkanethiolate by at least one of micromolding the palladium alkanethiolate in capillaries, offset printing, inkjet printing, or silkscreen printing.

23. A method for forming a palladium sulfide film on a substrate, the method comprising:
   applying a palladium sulfide precursor to the substrate, wherein the palladium sulfide precursor comprises a palladium organothiolate; and
   heating the palladium sulfide precursor in an atmosphere of flowing argon in a reaction chamber and the palladium sulfide comprises $Pd_{16}S_7$.

24. The method of claim 23, wherein the conditions in the reaction chamber include a temperature of from about 180 degrees C. to about 300 degrees C. and a reaction time of from about 100 minutes to about 200 minutes.

25. A method for forming a palladium sulfide film on a substrate, the method comprising:
   applying a palladium sulfide precursor to the substrate, wherein the palladium sulfide precursor comprises a palladium organothiolate; and
   heating the palladium sulfide precursor to decompose the palladium sulfide precursor to form $Pd_4S$.

26. The method of claim 25, wherein the $Pd_4S$ is a single phase, crystalline $Pd_4S$.

* * * * *

UNITED STATES PATENT AND TRADEMARK OFFICE
CERTIFICATE OF CORRECTION

PATENT NO. : 8,563,092 B2
APPLICATION NO. : 12/881700
DATED : October 22, 2013
INVENTOR(S) : Kulkarni et al.

It is certified that error appears in the above-identified patent and that said Letters Patent is hereby corrected as shown below:

On the Title Page, Item (75), under "Inventors", in Column 1, Line 1, delete "Giridhar U" and insert -- Giridhar U. --, therefor.

On the Title Page, Item (73), under "Assignee", in Column 1, Line 1, delete "Jawaharial" and insert -- Jawaharlal --, therefor.

On Title Page 2, Item (56), under "OTHER PUBLICATIONS", in Column 2, Line 6, delete ""Tetrapaladium" and insert -- "Tetrapalladium --, therefor.

In the Drawings

In Fig. 6, Sheet 6 of 6, delete "uP/uC/DSP" and insert -- μP/μC/DSP --, therefor.

In the Specification

In Column 2, Line 6, delete "sulfide; and" and insert -- sulfide; --, therefor.

In Column 6, Line 28, delete "system 10, and/or" and insert -- system 10, 20 and/or --, therefor.

Signed and Sealed this
Twenty-ninth Day of April, 2014

Michelle K. Lee
*Deputy Director of the United States Patent and Trademark Office*